Oct. 13, 1964    P. F. GIRARD    3,152,778
ARTICULATED SPREADER BAR LATERAL CONTROL
SYSTEM FOR FLEXIBLE WING AIRCRAFT
Filed Feb. 25, 1963    2 Sheets-Sheet 1

INVENTOR.
PETER F. GIRARD
BY
Knox & Knox

United States Patent Office 3,152,778
Patented Oct. 13, 1964

3,152,778
ARTICULATED SPREADER BAR LATERAL CONTROL SYSTEM FOR FLEXIBLE WING AIRCRAFT
Peter F. Girard, La Mesa, Calif., assignor to The Ryan Aeronautical Company, San Diego, Calif.
Filed Feb. 25, 1963, Ser. No. 260,608
8 Claims. (Cl. 244—46)

The present invention relates to aircraft, more specifically to an articulated spreader bar lateral control system for flexible wing aircraft.

The primary object of this invention is to provide a lateral control system for flexible wing aircraft, wherein the spreader bar holding the wings in open position has articulated outer portions pivoted in such a manner that control movements applied to the wings through the articulated portions are assisted by the natural aerodynamic loads on the structure, effective primarily as compressive load on the spreader bar, so greatly reducing the control force necessary to move the wings.

Another object of this invention is to provide a control system which is adaptable to various types of flexible wing aircraft and which can be arranged to give any desired degree of control assist, dependent of the particular aircraft function and performance.

A further object of this invention is to provide a control system which is actuated in a manner similar to conventional lateral control means and is thus adaptable to conventional control actuating mechanisms.

With these and other objects definitely in view, this invention consists in the novel construction, combination and arrangement of elements and portions as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawing.

General Structure

Figure 1:
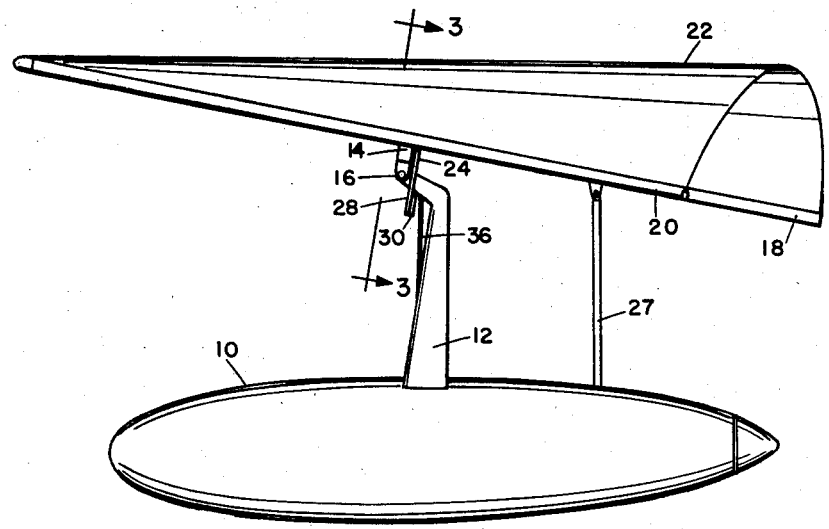
FIGURE 1 is a side elevation view of an aircraft incorporating the control system.
Figure 2:
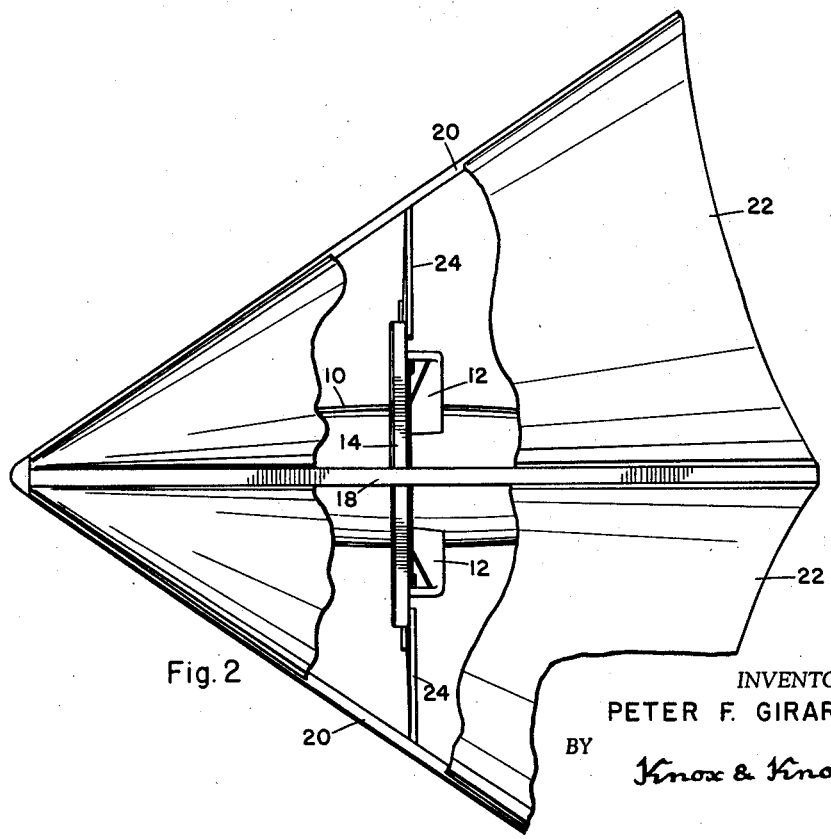
FIGURE 2 is a top plan view thereof with portions of the wings cut away.

The aircraft includes a body 10 which may be a fuselage or container, depending on the aircraft function. Any suitable propulsion means may be used and control can be manual, automatic, or remotely operated. Extending upwardly from the body 10 are a pair of laterally spaced, fixed masts 12 on top of which is mounted a transverse rigid spreader bar 14, pivotally secured to said masts by hinge brackets 16 to pivot about a transverse axis parallel to the spreader bar. Fixed to the spreader bar 14 is a longitudinal keel 18 comprising the central supporting member for the wings. Secured to the forward end of keel 18 are leading edge members 20 extending angularly outwardly and rearwardly, and fixed between the keel and leading edge members are flexible, membrane-like wing panels 22. The panels 22 may be of rubberized or plastic coated fabric, or similar non-porous flexible material capable of supporting the necessary aerodynamic loads. At the ends of the spreader bar 14 are extension arms 24 pivotally attached to said spreader bar by hinge pins 26 to swing upwardly and downwardly in a plane substantially parallel to the spreader bar and perpendicular to keel 18, the outer ends of said extension arms being fixed to the leading edge members 20 to hold the wings in spread position. A pitch control rod 27 is connected from the rear portion of keel 18 to suitable actuating means in the body 10 to tilt the wings about the axes of hinge brackets 16 and provide pitch control of the aircraft. Other pitch control means may be used, that illustrated merely being an example.

Control System

Figure 3:
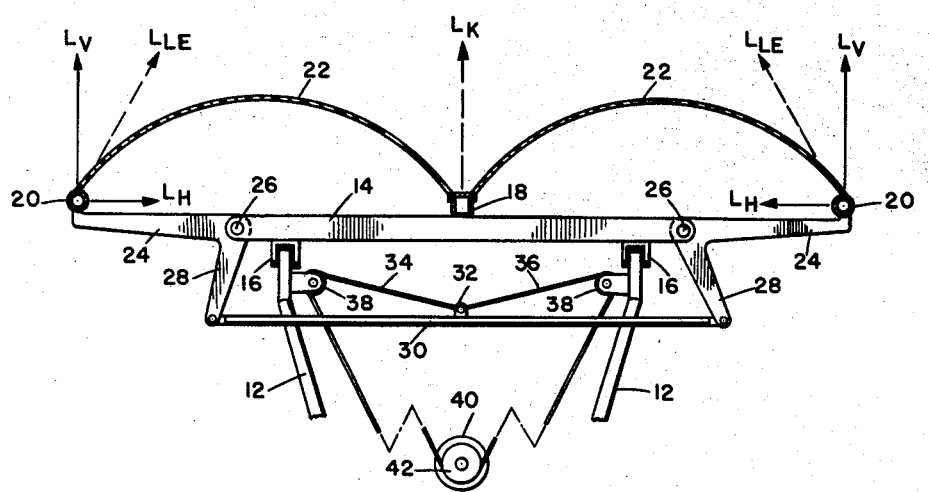
FIGURE 3 is an enlarged sectional view taken on line 3—3 of FIGURE 1, with the wings in neutral or level position.

With reference to FIGURES 1–4, each of the extension arms 24 has an integral bellcrank arm 28 extending downwardly from the hinged end thereof, said bellcrank arms being interconnected by a tie rod 30. At the center of tie rod 30 is a tie lug 32 from which control cables 34 and 36 lead, over pulleys 38 mounted on the masts 12, to the body 10. The cables 34 and 36 are coupled to any suitable actuating means to provide opposite action on the cables, similar to the aileron control means of a conventional aircraft. In FIGURE 3, a simple reversible motor 40 having a pulley 42 on which cables 34 and 36 are wound, is indicated as one example of such an actuating means.

Operation

Figure 4:
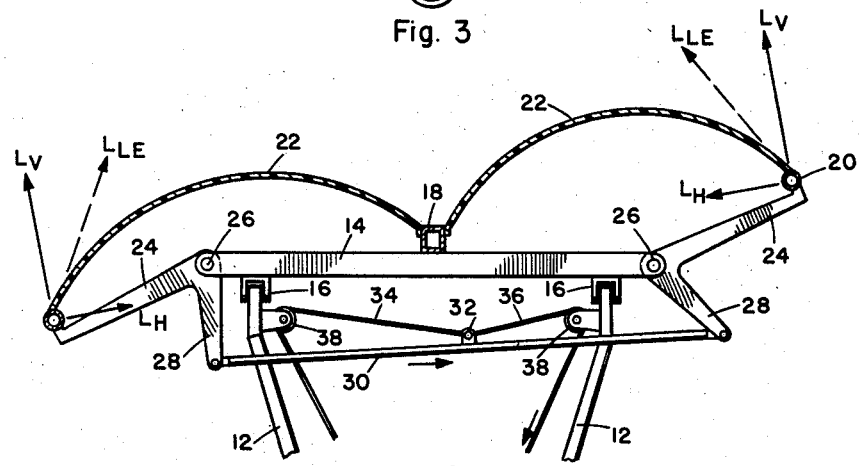
FIGURE 4 is a view similar to FIGURE 3, but illustrating the forces acting on the control system with the wings tilted.

In the neutral position of the wings, the aerodynamic loads on wing panels 22 in flight are applied to the keel 18 and leading edge members 20, as indicated by directional arrows LK and LLE, respectively, in FIGURES 3 and 4. Force LK is transmitted directly to the body 10 through the spreader bar 14 and masts 12 and, being effective symmetrically at the aircraft center line, has no effect on the control operation. The forces LLE can be broken down into their vertical and horizontal components, represented by arrows LV and LH, respectively. In the neutral position the forces LV are carried to the tie rod 30 and are equal and symmetrical, while the forces LH are equal and opposed so that the control system is in equilibrium.

When one cable such as the cable 36 in FIGURE 4, is shortened, causing tie rod 30 to be shifted to one side, the bellcrank arms 28 swing and move the extension arms 24 to raise one leading edge member 20 and lower the other. It will be evident that the moments of forces LH are now effective on opposite sides of spreader bar 14, the aerodynamic load on the raised wing panel 22 tending to pull that leading edge member 20 inwardly and increase the wing tilt angle. Thus the action of the controls to tilt the wings is assisted by the existing aerodynamic forces, reducing the forces necessary to operate the control system. This is very beneficial to a pilot using a manual control system and also permits the use of smaller power units in an automatic system, the forces required to control a flexible wing vehicle usually being considerable since this type of wing is extremely stable and resists deflection.

In flexible wing type aircraft wherein directional control is obtained by moving the entire wing, it is actually the change in the center of gravity of the aircraft relative to the center of pressure of the wing which provides the directional change moment. Thus when a particular control action is effected, the tendency of the aircraft to return to its neutral center of gravity to center of pressure position, due to inherent stability, will assist the return of the wings to their neutral position.

The degree of assistance provided by the system can be changed to suit specific aircraft by varying the spanwise location of the hinge pins 26, the length of extension arms 24 and the angle between each extension arm and its bellcrank arm 28. In particular, angles between the extension arm and bellcrank arm of other than 90 degrees will provide a differential action, or unequal up and down displacement of opposite wings, in the manner well known as applied to conventional ailerons.

*Alternative Structure*

Figure 5:
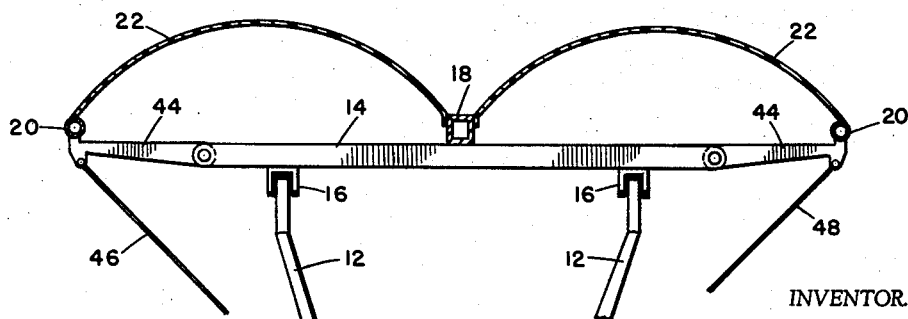
FIGURE 5 is a view similar to FIGURE 3, showing an alternative structure.

The structure illustrated in FIGURE 5 utilizes the above described arrangement of masts 12, spreader bar 14, keel 18, leading edge members 20 and wing panels 22. However, extension arms 44 at the ends of spreader bar 14 do not have bellcrank portions. Instead control cables 46 and 48 are connected directly to the outer ends of extension arms 44, so that movements of the cables raise and lower the leading edge members, the operation being as previously described. This arrangement is suitable for small or light aircraft, since the aerodynamic loads are applied directly to the cables 46 and 48, whereas in the configuration of FIGURES 1–4 the tie rod 30 carries the loads. This simplified system of FIGURE 5 does, however, eliminate the tie rod and pulley means and may be desirable in instances where the loads involved are reasonable.

It is understood that minor variation from the form of the invention disclosed herein may be made without departure from the spirit and scope of the invention, and that the specification and drawings are to be considered as merely illustrative rather than limiting.

I claim:

1. In an aircraft;
a wing having a rigid longitudinal central keel member;
flexible wing panels secured longitudinally to and extending on opposite sides of said keel member;
said wing panels having rigid outer edge members;
a transverse spreader bar extending on opposite sides of said keel member and being fixed against lateral motion relative to the aircraft;
said spreader bar having pivotal outer extension arm portions connected to and supporting said outer edge members;
and means to move said extension arm portions to raise and lower said wing panels relative to said spreader bar.

2. In an aircraft;
a wing having a rigid longitudinal central keel member;
flexible wing panels extending on opposite sides of said keel member;
said wing panels having rigid outer edge members;
a transverse spreader bar extending on opposite sides of said keel member and being fixed against lateral motion relative to the aircraft;
said spreader bar having pivotal outer extension arm portions connected to said outer edge members;
said extension arm portions bein interconnected to move in opposite directions;
and means to move said extension arm portions to raise and lower said wing panels relative to said spreader bar.

3. In an aircraft, a wing comprising:
a rigid longitudinal central keel;
leading edge members secured to the forward end of said keel and extending angularly rearwardly on opposite sides thereof;
flexible wing panels secured to and between said keel and said leading edge members;
a transverse spreader bar extending on opposite sides of said keel and being fixed against lateral motion relative to the aircraft;
said spreader bar having extension arms pivotally attached to the ends thereof and connected to and supporting said leading edge members;
and means to swing said extension arms selectively upwardly and downwardly to raise and lower said leading edge members relative to said spreader bar.

4. In an aircraft, a wing comprising:
a rigid longitudinal central keel;
leading edge members secured to the forward end of said keel and extending angularly rearwardly on opposite sides thereof;
flexible wing panels secured to and between said keel and said leading edge members;
a transverse spreader bar extending on opposite sides of said keel and being fixed against lateral motion relative to the aircraft;
said spreader bar having extension arms pivotally attached to the ends thereof and connected to said leading edge members;
said extension arms having bellcrank portions;
a tie rod interconnecting said bellcrank portions;
and means to shift said tie rod, thereby causing said extension arms to raise and lower said wing panels.

5. In an aircraft, the wings of which include a central longitudinal kneel, flexible wing panels secured to said keel longitudinally at their inner ends and extending on opposite sides thereof, rigid edge members secured to the outer edges of said panels, and a transverse spreader bar fixed against lateral motion relative to the aircraft and extending on opposite sides of said keel, a lateral control system comprising:
extension arms pivotally attached to opposite ends of said spreader bar and constituting integral end portions thereof;
the outer ends of said extension arms being secured to and supporting said outer edge members;
and actuating means connected to said extension arms to move the arms and selectively raise and lower said wing panels.

6. In an aircraft, the wings of which include a central longitudinal keel, flexible wing panels secured to said keel longitudinally at their inner ends and extending on opposite sides thereof, rigid edge members secured to the outer edges of said panels, and a transverse spreader bar fixed against lateral motion relative to the aircraft and extending on opposite sides of said keel, a lateral control system comprising:
extension arms constituting integral end portions of said spreader bar and being pivotally attached to opposite ends of said spreader bar to swing in a plane substantially parallel to said spreader bar and perpendicular to said keel;
the outer ends of said extension arms being secured to and supporting said outer edge members;
and actuating means connected to said extension arms to move the arms and selectively raise and lower said wing panels.

7. In an aircraft, the wings of which include a central longitudinal keel, leading edge members attached to and extending angularly rearwardly on opposite sides from the forward end of said keel, flexible wing panels secured between said keel and said leading edge members, and a transverse spreader bar fixed against lateral motion relative to the aircraft and extending on opposite sides of said keel to support said panels in spread position, a lateral control system comprising:
extension arms pivotally attached to opposite ends of said spreader bar to swing in a plane substantially parallel to said spreader bar and perpendicular to said keel;
the outer ends of said extension arms being secured to said leading edge members;
and actuating means connected to said extension arms to move the arms in opposite directions and selectively raise and lower said wing panels.

8. In an aircraft, the wings of which include a central longitudinal keel, leading edge members attached to and extending angularly rearwardly on opposite sides from the forward end of said keel, flexible wing panels secured between said keel and said leading edge members, and a transverse spreader bar fixed against lateral motion relative to the aircraft and extending on opposite sides of said keel to support said panels in spread position, a lateral control system comprising:

extension arms pivotally attached to opposite ends of said spreader bar to swing in a plane substantially parallel to said spreader bar and perpendicular to said keel;

the outer ends of said extension arms being secured to said leading edge members;

said extension arms having bellcrank portions integral therewith;

said bellcrank portions being interconnected to move said extension arms in opposite directions;

and actuating means connected to said bellcrank portions to swing said extension arms and selectively raise and lower said wing panels.

References Cited in the file of this patent

UNITED STATES PATENTS

| | | |
|---|---|---|
| 1,518,621 | Wenk | Dec. 9, 1924 |
| 3,048,354 | Doutt | Aug. 7, 1962 |

OTHER REFERENCES

"Popular Mechanics" (Everett), November 1961 pages 85 and 87 relied on).